(12) United States Patent  (10) Patent No.: US 9,291,727 B2
Eick et al.  (45) Date of Patent: Mar. 22, 2016

(54) MULTIPLE FREQUENCY GEOPHONE STRINGS

(75) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 846 days.

(21) Appl. No.: 13/517,734

(22) Filed: Jun. 14, 2012

(65) Prior Publication Data

US 2013/0021875 A1 Jan. 24, 2013

Related U.S. Application Data

(60) Provisional application No. 61/509,451, filed on Jul. 19, 2011.

(51) Int. Cl.
*G01V 1/16* (2006.01)
*G01V 1/20* (2006.01)
*G01V 1/00* (2006.01)

(52) U.S. Cl.
CPC .............. *G01V 1/003* (2013.01); *G01V 1/168* (2013.01); *G01V 1/20* (2013.01); *G01V 1/201* (2013.01)

(58) Field of Classification Search
CPC ........ G01V 1/168; G01V 1/202; G01V 1/201
See application file for complete search history.

(56) References Cited

U.S. PATENT DOCUMENTS

| | | | | |
|---|---|---|---|---|
| 3,719,924 A | * | 3/1973 | Muir | G01V 1/20 367/25 |
| 3,911,388 A | * | 10/1975 | Crump et al. | 367/180 |
| 4,285,054 A | | 8/1981 | McNeel | |
| 4,597,070 A | | 6/1986 | Redecker | |
| 4,839,872 A | * | 6/1989 | Gragnolati et al. | 367/180 |
| 5,317,383 A | * | 5/1994 | Berni | G01C 15/002 181/112 |
| 5,475,652 A | | 12/1995 | McNeel et al. | |
| 5,627,798 A | * | 5/1997 | Siems et al. | 367/76 |
| 6,002,641 A | * | 12/1999 | Chien | 367/58 |
| 6,075,754 A | * | 6/2000 | VanZandt | G01V 1/181 367/182 |
| 6,219,620 B1 | * | 4/2001 | Park et al. | 702/14 |
| 6,353,577 B1 | * | 3/2002 | Orban et al. | 367/43 |
| 6,791,901 B1 | | 9/2004 | Robertsson et al. | |
| 7,224,642 B1 | * | 5/2007 | Tran | 367/77 |
| 7,284,431 B1 | | 10/2007 | Barger | |
| RE41,626 E | | 9/2010 | Cheung et al. | |
| 2003/0115959 A1 | * | 6/2003 | Vanzandt | G01P 15/132 73/514.17 |
| 2005/0068199 A1 | * | 3/2005 | Succi | G01S 3/8083 340/933 |
| 2005/0195686 A1 | * | 9/2005 | Vaage et al. | 367/21 |
| 2005/0201206 A1 | * | 9/2005 | Luc | G01V 1/181 367/182 |

(Continued)

OTHER PUBLICATIONS

PCT/US12/42420 PCT International Search Report (PCT/ISA/210) Dated Sep. 24, 2012.

*Primary Examiner* — Ari M Diacou
(74) *Attorney, Agent, or Firm* — ConocoPhillips Company

(57) ABSTRACT

The invention relates to acquiring seismic data from the earth using geophones that are tuned to have differing frequency sensitivity ranges. The differing frequency sensitivity ranges cover a broader effective frequency range so that low frequency energy and high frequency energy are less attenuated in the raw data record. Two separate geophones would be used at the same node and three or more geophones may be used in combination at each node. When three or more geophones are used in combination, each may have a separate but overlapping frequency sensitivity range or two or more of the geophones may have the same frequency range sensitivity.

13 Claims, 4 Drawing Sheets

(56) References Cited

U.S. PATENT DOCUMENTS

| | | | |
|---|---|---|---|
| 2005/0251343 A1* | 11/2005 | Zehavi | 702/18 |
| 2007/0223313 A1* | 9/2007 | Kimball | 367/134 |
| 2008/0175101 A1* | 7/2008 | Saenger | G01V 1/28 367/43 |
| 2009/0164051 A1* | 6/2009 | Vervoordeldonk | G03F 7/709 700/302 |
| 2010/0027235 A1* | 2/2010 | Samuelson | 361/816 |
| 2010/0211225 A1* | 8/2010 | Heiland | 700/280 |
| 2011/0158042 A1* | 6/2011 | Moldoveanu et al. | 367/15 |
| 2011/0289787 A1* | 12/2011 | Yi et al. | 33/228 |
| 2011/0310701 A1* | 12/2011 | Schuster | 367/38 |
| 2012/0051181 A1* | 3/2012 | Eick et al. | 367/56 |
| 2012/0294116 A1* | 11/2012 | Kamata | 367/43 |
| 2014/0126327 A1* | 5/2014 | Swier et al. | 367/37 |

* cited by examiner

MULTIPLE FREQUENCY GEOPHONE STRINGS

CROSS-REFERENCE TO RELATED APPLICATIONS

This application is a non-provisional application which claims benefit under 35 USC §119(e) to U.S. Provisional Application Ser. No. 61/509,451 filed Jul. 19, 2011, entitled "MULTIPLE FREQUENCY GEOPHONE STRINGS," which is incorporated herein in its entirety.

STATEMENT REGARDING FEDERALLY SPONSORED RESEARCH

None.

FIELD OF THE INVENTION

This invention relates to seismic prospecting and especially to delivering seismic energy into the earth and receiving and recording the reflected and refracted seismic energy at the surface.

BACKGROUND OF THE INVENTION

In the process of acquiring reflected and refracted seismic energy from the earth, listening and recording equipment is typically arranged in long lines to form an array with locations or nodes along the lines where geophones are connected to the lines at the nodes. It is fairly common to have more than one geophone connected to a node or digitizing box and not uncommon to have two, three, four or five and sometimes many more at each node. For example, there was a survey in the Middle East that used 288 geophones at each node. For the purposes of this discussion, a node will represent a controlling box that could be an autonomous node or a cable connected analog to digital conversion box in the case of a cable based recorder. Typically, the geophones are stabbed into the ground in the same formation or arrangement around each node. The data coming from all the geophones is combined at the node and digitized so as to provide data from the node without separately identifying what each individual geophone received. The data is separated by node so that each node is viewed as a single receiver point and all the receiver points form a large three dimensional array for receiving and recording seismic energy emanating from the earth.

An individual geophone typically includes a magnet and an electrically conductive coil where one or both are arranged to move vertically or horizontally in the case of a three component geophone along an axis, one relative to the other. As the magnet and coil move relative to one another, the magnet induces a small electrical current in the coil that can be measured and recorded. Typically, springs having very minimal resistance to movement are used to bias the moving elements into a central location or neutral position where vibrations from the earth cause the magnet to deflect from the neutral position. The spring strength is typically arranged to be very slight so that slight vibrations of the ground due to the arrival of a seismic wave will cause movement of the magnet within the coil.

For hydrocarbon prospecting, geophysicists are interested in data having a broad frequency spectrum. Low frequency energy is used for the analysis of rock densities and wave velocity through the substructures while high frequencies provide higher resolution on smaller scale substructures. Geophones for hydrocarbon prospecting are designed to accurately sense and record a broad frequency spectrum of seismic energy with magnets size and weights to be within tight tolerances along with precisely engineered springs to permit movement in response to a broad frequency array. Most geophones used for hydrocarbon prospecting are rated for 10 Hz and greater although data is acquired below 10 Hz that is used. However, data below 8 Hz is typically absent in the data record.

BRIEF SUMMARY OF THE DISCLOSURE

The invention more particularly relates to a process for acquiring seismic data for prospecting for hydrocarbons. An array of receiver locations is created in the field where each receiver location includes a node and at least a first and second geophone is connected to each node in the array of receiver locations. The first geophone is configured to have a first vibrational frequency sensitivity range and the second geophone is configured to have a second and different vibrational frequency sensitivity range. Seismic energy is delivered into the ground to create an upcoming seismic wave field to be sensed by the geophones at the various receiver locations of the array.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
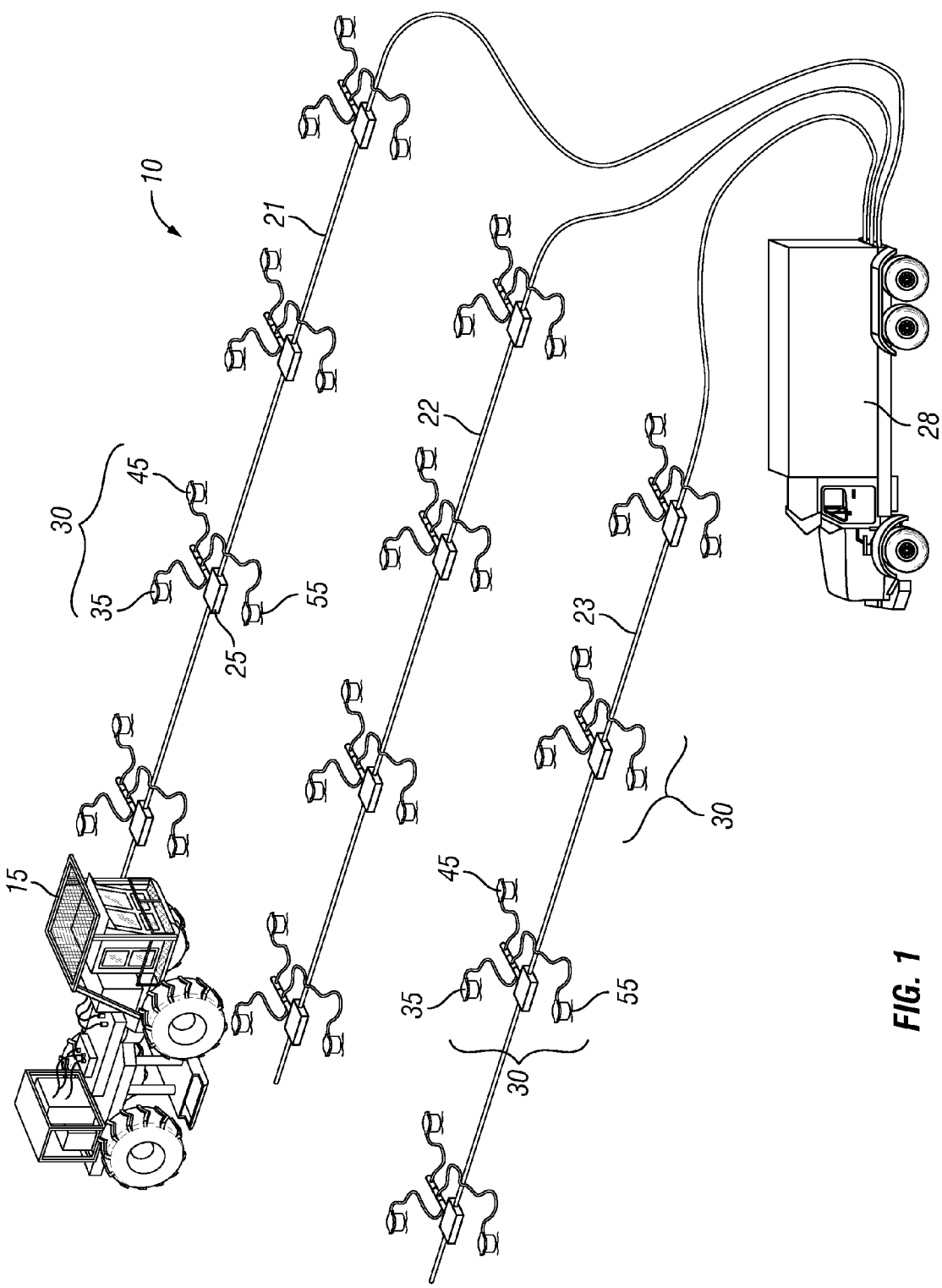
FIG. 1 is perspective view of a simplified seismic acquisition system showing a seismic vibrator delivering seismic energy into the ground while lines of receivers are laid out in an array for sensing and recording seismic energy reflecting from the subsurface.

As shown in FIG. 1, a seismic acquisition generally indicated by the number 10 is shown where a seismic vibrator 15 is positioned to shake the ground and deliver seismic energy into the earth. Lines 21, 22 and 23 are laid out with a series of nodes 25 along the length thereof with a geophone installation 30 attached to each node 25. Each node 25 includes circuitry to recognize what is sensed by the geophone installation 30 and communicate such signals to a recorder truck 28.

Figure 2:
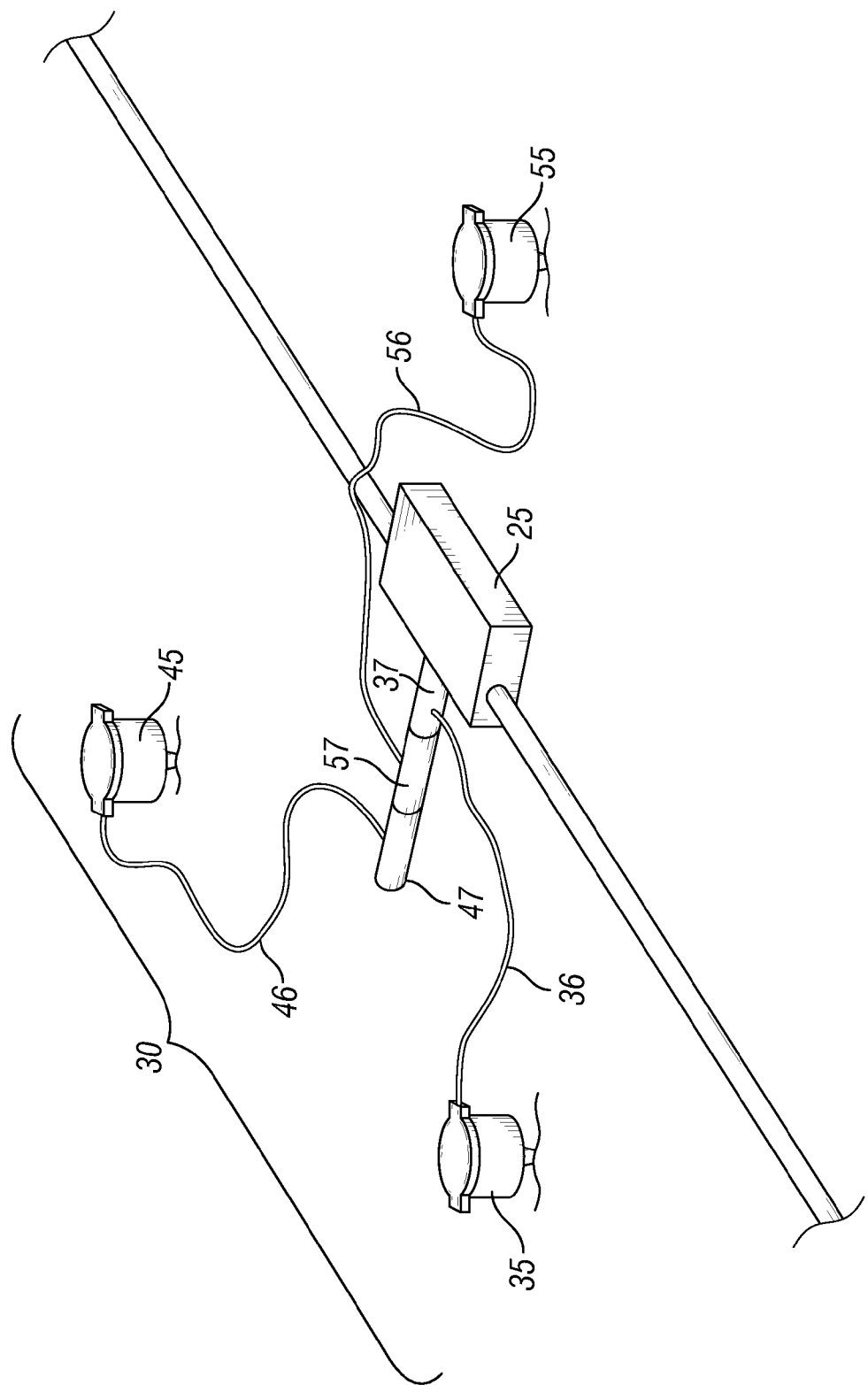
FIG. 2 is a close up view of three geophones attached to a single node of a seismic cable.

Turning to FIG. 2, a geophone installation 30 is shown to include three separate geophones 35, 45 and 55, each stabbed into the ground. This is the normal mode of deployment for a point receiver or a "potted" array. In the conventional arrangement, each of the geophones 35, 45 and 55 are the same design and configuration. The number of such geophones is shown as three, but in practice may be one, two, three, four or five and even more in some circumstances. The signals provided to the nodes 25 are conventionally added together to provide essentially a combined signal for each node 25 without breaking down what is sensed into the vibrations sensed by each separate geophone. Each geophone 35, 45 and 55 include a connecting wire 36, 46 and 56, respectively, and a plug 37, 47 and 57, respectively, for connecting the geophones to the node 25. Each plug is arranged so that while the first plug 37 is plugged into the node 25, the second plug 47 is connected into the back of the first plug 37 and the third plug is connected into the back of the second plug 57. This plugging arrangement is conventional and the stacking of the respective plugs provides the node with signals from each geophone of what the geophone installation 30 is sensing, cumulatively.

Figure 3:
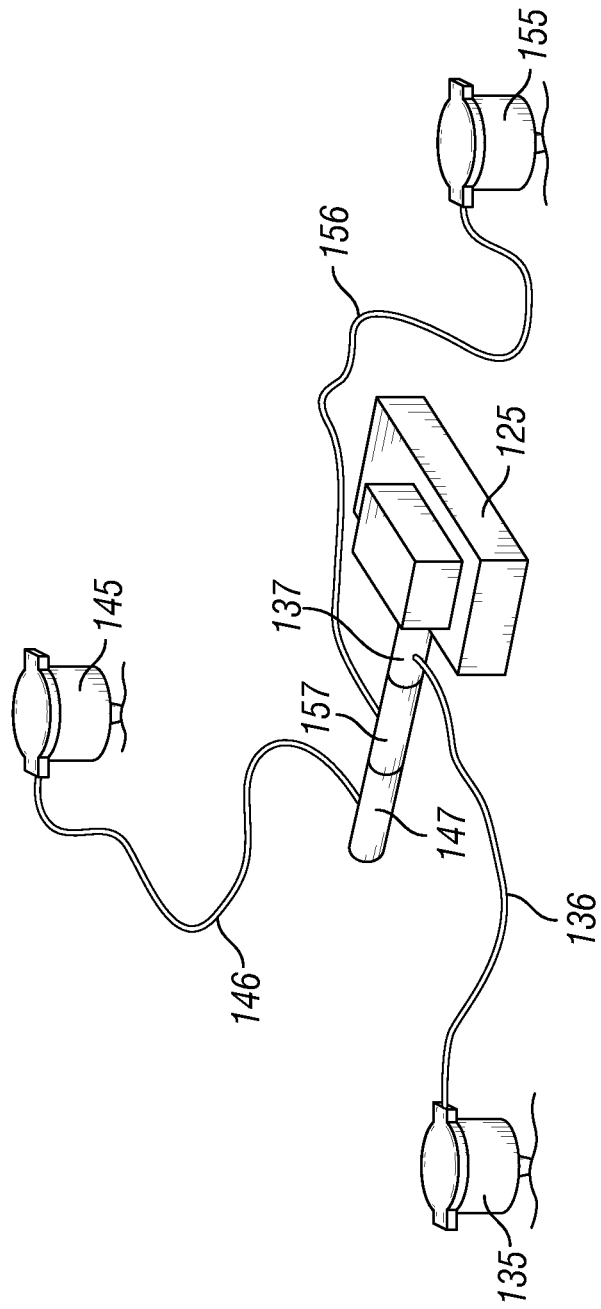
FIG. 3 is a close up view comparable to FIG. 2 showing three geophones connected to an autonomous recorder to provide data for a receiver point comparable to the FIG. 2 set up without using conventional long seismic cables.

In a comparable installation shown in FIG. 3, an autonomous node 125 is connected to a first geophone 135, a second geophone 145 and a third geophone 155. The autonomous node receives the signals from the geophones, digitizes the signal and record the digitized signal for later download.

Figure 4:
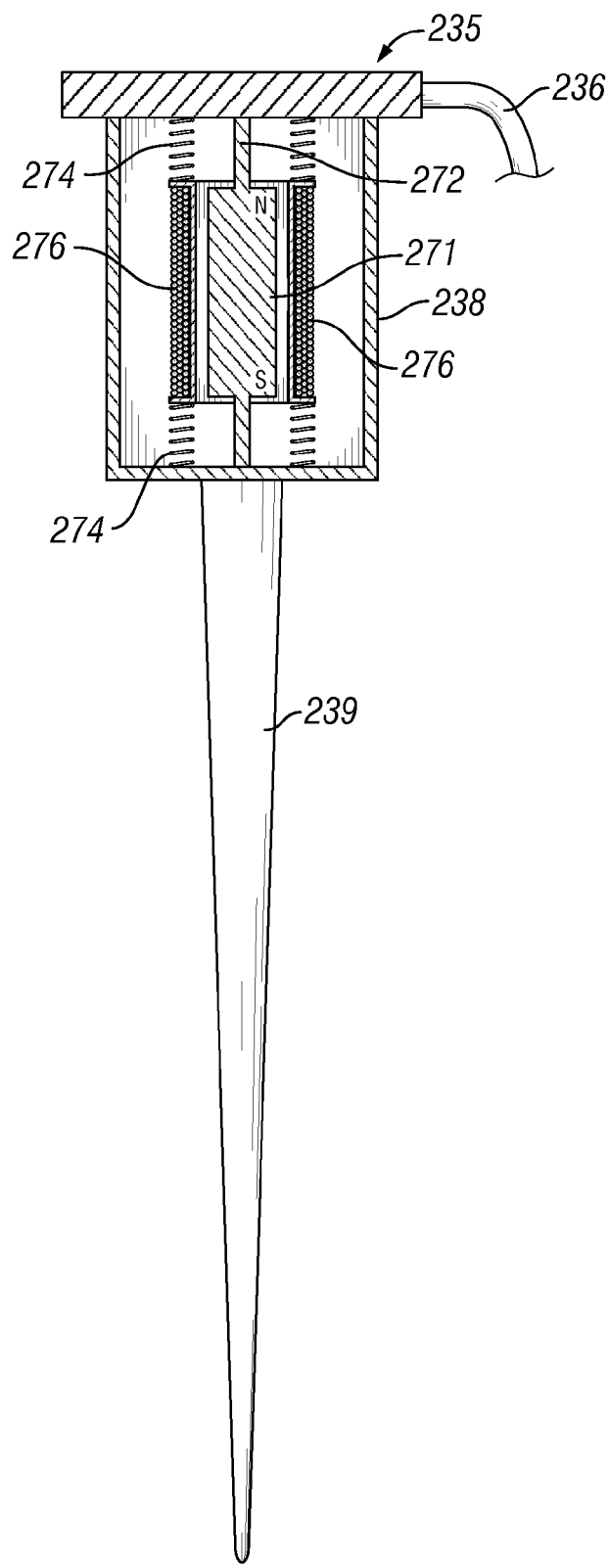
FIG. 4 is a cross sectional view showing the inside of a basic geophone used as a receiver for seismic prospecting.

Referring now to FIG. 4, a geophone 235 is shown with a body 238 and a spike 239 at the bottom thereof for being stabbed into the ground. Within the body 238 is a magnet 271 fixed on a vertical post 272. Around the outside of the magnet 271 is an electric coil 276 that moves vertically with respect to the fixed magnet 271 The coil 276 is a common element in current geophone design and may include copper wire wrapped in a prescribed manner around a plastic frame that is inconsequential, magnetically and electrically. Springs 274 are attached at the top and bottom of the coil 276 to keep it in a vertically central location called a neutral position with respect to the magnet 271. As the geophone is fixed into the ground by the spike 239, vibrations in the ground cause the coil to move up and down along the magnet 271. The relative movement of the coil with respect to the magnet 271 induces a small but measurable electric current in the coil. That current is provided down the connecting wire 236 to the node for communication to the truck 28.

Geophones used for prospecting are sized and engineered to provide reliable signals from about 10 Hz vibrations up to well over 200 Hz. Geophones for sensing earthquakes have magnets and coils that are necessarily larger in mass with corresponding springs to sense vibrations at less than 1 Hz. According to the current invention, each node is provided with at least two geophones, but the geophones rather than being the same, are constructed with at least a different magnet size, different coil size or structure or different spring strength to be sensitive to at least a slightly different frequency spectrums. In particular, each node 25 according to the present invention would include a first geophone 135 having sensitivity at less than 10 Hz and preferably down to about 4 Hz and more preferably down to about 2 Hz and even using a geophone that has sensitivity at the low end to about 1 Hz. The upper end of the frequency spectrum for such a geophone would likely be too low for use in a hydrocarbon prospecting seismic study alone but each geophone installation 30 would include a second geophone 145 having frequency sensitivity up to at least 120 Hz and where the frequency range sensitivities of the first and second geophones 135 and 145 overlap. For example, a first geophone may be rated for 2 Hz up to 55 Hz while the second may be rated from 10 Hz up to 140 Hz. The signals of the two geophones would be combined by the node and recorded as it if were one big broad spectrum geophone.

In another aspect of the invention, two higher frequency sensitivity geophones may be arranged at each node along with one or two or three lower frequency sensitivity geophones. It is preferred that each node be provided with the same set up regarding the number of geophones, the number of low frequency geophones and the number of high frequency geophones and the arrangement of the high and low frequency geophones relative to the node in the array of receivers.

In another aspect of the invention, three geophones may be used at each node where each geophone has a separate frequency sensitivity range such that a first is a low frequency range, the second is a medium frequency range and the third is a high frequency range. This arrangement may accommodate multiples of each range and may include more than three overlapping ranges. For example, each node may be provided with five geophones where one geophone has a very low range sensitivity, a second geophone has a medium low range sensitivity, a third geophone has a medium range sensitivity, a fourth geophone has a medium high range sensitivity and the fifth has a high range sensitivity where all geophones overlap or only a few overlap.

By analogy, consider an electronic speaker for high fidelity or hi-fi stereo sound system. Most hi-fi speakers have component speakers comprising a tweeter for high frequency sound, a midrange speaker for midrange frequency sound and a woofer for low frequency sound. Most higher end systems include a subwoofer for really low frequencies. By properly choosing the individual component speakers and drivers and then managing the crossover signals, one can create a flat spectrum for the sound coming from the sound system. The present invention employs a concept that is, in a sense, the opposite of a component speaker. By carefully choosing our geophones and arranging them on the string with the proper wiring, the composite signal from the diverse geophones captures a much broader bandwidth then any one geophone could do on its own.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 4,285,054 (McNeel), "Geophone" (Aug. 18, 1981)
2. U.S. Pat. No. 4,597,070 (Redecker), "Geophone", (Jun. 24, 1986)
3. U.S. Pat. No. 5,475,652 (McNeel et al.); "Dual Gimbal Geophone" (Dec. 12, 1995).
4. U.S. Pat. No. 7,284,431 (Barger) "Geophone" (Oct. 23, 2007).
5. U.S. Re. 41,626 (Cheung et al.), "Multiple Magnet Transducer with Differential Magnetic Strengths," (Sep. 7, 2010) . . . .

The invention claimed is:

1. A process for acquiring seismic data for prospecting for hydrocarbons comprising:
    a) creating an array of receiver locations in the field where each receiver location includes a node;
    b) providing at least a first and a second geophone connected to each node of the array of receiver locations where the first and second geophones provide a composite signal of the vibrations sensed from the ground where the first geophone is configured to have a first vibrational frequency sensitivity range and the second geophone is configured to have a second and different vibrational frequency sensitivity range;
    c) providing a third geophone at each node wherein the third geophone is configured to have a third and different vibrational frequency sensitivity range; and
    d) delivering seismic energy into the ground to create an upcoming seismic wave field to be sensed by the geophones at the various receiver locations of the array.

2. The process according to claim 1 wherein the step of providing a third geophone having a third and different vibrational frequency sensitivity range more particularly includes the third geophone frequency sensitivity range overlapping the first and second frequency sensitivity ranges.

3. The process according to claim 1 wherein each node includes an autonomous recorder.

4. The process according to claim 3 wherein the array of receiver locations is altered by collecting autonomous recorders from some receiver locations and deploying autonomous recorders to new receiver locations.

5. The process according to claim 1 wherein each node is attached to a long cable that includes multiple nodes along its length.

6. A process for acquiring seismic data for prospecting for hydrocarbons comprising:
    a) creating an array of receiver locations in the field where each receiver location includes a node;
    b) providing at least a first and a second geophone connected to each node of the array of receiver locations where the first and second geophones provide a composite signal of the vibrations sensed from the ground where the first geophone is configured to have a first vibrational frequency sensitivity range and the second geophone is configured to have a second and different vibrational frequency sensitivity range;
    c) providing a third geophone at each node wherein the third geophone has the same vibrational frequency sensitivity as one of the first and second vibrational frequency sensitivity ranges; and
    d) delivering seismic energy into the ground to create an upcoming seismic wave field to be sensed by the geophones at the various receiver locations of the array.

7. A process for acquiring seismic data for prospecting for hydrocarbons comprising:
    a) creating an array of receiver locations in the field where each receiver location includes a node;
    b) providing at least a first and a second geophone connected to each node of the array of receiver locations where the first and second geophones provide a composite signal of the vibrations sensed from the ground where the first geophone is configured to have a first vibrational frequency sensitivity range and the second geophone is configured to have a second and different vibrational frequency sensitivity range;
    c) providing additional geophones at each node wherein at least one of the additional geophones has the same vibrational frequency sensitivity as one of the first and second vibrational frequency sensitivity ranges; and
    d) delivering seismic energy into the ground to create an upcoming seismic wave field to be sensed by the geophones at the various receiver locations of the array.

8. The process according to claims 1, 6, or 7 wherein the first and second vibrational frequency sensitivity ranges do not overlap.

9. The process according to claims 1, 6, or 7 wherein the first and second vibrational frequency sensitivity ranges overlap.

10. The process according to claims 1, 6, or 7 further including the step of connecting each geophone to the node.

11. A process for acquiring seismic data for prospecting for hydrocarbons comprising:
    a) creating an array of receiver locations in the field where each receiver location includes a node;
    b) providing at least a first and a second geophone connected to each node of the array of receiver locations where the first and second geophones provide a composite signal of the vibrations sensed from the ground where the first geophone is configured to have a first vibrational frequency sensitivity range and the second geophone is configured to have a second and different vibrational frequency sensitivity range,
    wherein each node includes a plurality of geophones where each geophone has a spike and each spike is inserted into the ground wherein at least two geophones have the same frequency sensitivity range and at least one additional geophone has a frequency sensitivity range different from the frequency sensitivity range of the first two geophones.

12. The process according to claims 1, 6, 7, or 11 wherein said first geophone has a vibrational frequency sensitivity range within the range of 1 to 100 Hz, 2 to 100 Hz, or 2 to 60 Hz and said second geophone has a vibrational frequency sensitivity range within the range of 8 to 300 Hz, 8 to 250 Hz, or 10 to 200 Hz.

13. The process according to claims 1, 6, 7, or 11 wherein geophones having different vibrational frequency sensitivity ranges have one or more of:
    a) magnets of different sizes;
    b) springs of different strengths;
    c) coils of different sizes; or
    d) coils of different structures.

* * * * *